US 6,623,859 B1

(12) United States Patent
Ito

(10) Patent No.: US 6,623,859 B1
(45) Date of Patent: Sep. 23, 2003

(54) WATER QUALITY IMPROVING MATERIALS AND METHOD FOR PRODUCING THE SAME MATERIALS

(75) Inventor: Junro Ito, Aichi-ken (JP)

(73) Assignees: Shibatatouki Co., Ltd., Mizunam (JP); Echizenshikki Co., Ltd., Sabae (JP); Enuemu Co., Ltd., Fukui (JP)

(*) Notice: Subject to any disclaimer, the term of this patent is extended or adjusted under 35 U.S.C. 154(b) by 81 days.

(21) Appl. No.: 09/676,587

(22) Filed: Sep. 29, 2000

(30) Foreign Application Priority Data

May 18, 1999 (JP) .......................................... 11-136550

(51) Int. Cl.[7] .............................................. B32B 15/02
(52) U.S. Cl. ........................ 428/403; 428/402; 106/813; 501/80; 501/128; 422/5; 422/43
(58) Field of Search .......................... 106/813; 422/43, 422/5; 428/402, 403; 501/80, 128

(56) References Cited

U.S. PATENT DOCUMENTS 4,496,475 A * 1/1985 Abrams ....................... 252/514
5,229,337 A * 7/1993 Robyn et al. ............... 501/128
6,264,875 B1 * 7/2001 Pyun ......................... 252/62.55
6,402,991 B1 * 6/2002 Itakura et al. .............. 252/500

* cited by examiner

Primary Examiner—Cynthia H. Kelly
Assistant Examiner—Tamra L. Dicus
(74) Attorney, Agent, or Firm—Flynn, Thiel, Boutell & Tanis, P.C.

(57) ABSTRACT

The object of the present invention is to save labor, reduce cost, and to make detergents and wax unnecessary. Water quality improving materials used in a washing device are provided, wherein;

raw ceramic powder material containing tourmaline is adhered on the surfaces of ceramic carriers, and then fired to form tourmaline containing films, whereby washing powder is improved by activating water and the contained boric silica S1, S2 . . . adheres onto the surface W of an automobile, etc. As a form thereof, the boric silica S1, S2 . . . is adhered by an electrode position action due to the electrical charges generated by tourmaline and the water is activated by these electrical charges.

6 Claims, 5 Drawing Sheets

WATER QUALITY IMPROVING MATERIALS AND METHOD FOR PRODUCING THE SAME MATERIALS

BACKGROUND OF THE INVENTION

1. Field of the Invention

The present invention relates to water quality improving materials used in a washing device for washing the surfaces of automobiles, rolling stock, and ships by using only jets of water and forming coats on the washed surfaces and a method for producing the same materials.

2. Description of the Prior Art

In the past, the surfaces of automobiles, rolling stock, and ships have needed to be washed periodically since they become dirty due to rainfall and the adhesion of dust.

In particular, when automobiles were washed, the automobiles were washed with a detergent and then waxed in general, therefore, a lot of time, labor and cost have been necessary and environmental pollution occurred due to the detergents, etc.

In addition, recently, coat formation using specially compounded polymers have, in part, been performed, however, there was a drawback of high cost.

SUMMARY OF THE INVENTION

The present invention provides water quality improving materials used in a washing device which enables labor saving and reduced costs in washing work and which do not need chemicals such as a detergent and wax and a method for producing the same materials.

With respect to the above-described problem such that a lot of time, labor and cost is necessary to wash automobiles, etc. and a problem that the environment becomes polluted due to the use of the chemicals based on the prior art, the present invention provides water quality improving materials used in a washing device, wherein a raw ceramic powder material containing tourmaline is adhered on the surface of ceramic carriers and then fired to form tourmaline containing films, thereby the washing power is improved by activating water and the boric silica contained therein is adhered on the surface of the automobiles, etc.

As a form thereof, boric silica is adhered by an electrodeposition action due to electric charges generated by tourmaline and water is then activated by the electric charges.

In short, as a whole, the activated water containing boric silica, which was provided by making water pass through the water activation tank 3 filled with the granular water quality improving materials 6, 6a . . . , is jetted onto the surface W of the automobile, whereby the surface is washed and the coat M1 is formed, and therefore, washing of the automobile and formation of the coat M1 are performed by means only of the washing water which passed through the cartridge 7 filled with the water quality improving materials 6, 6a . . . which can be used semi-permanently and for a long period of time, and as a result, time, labor, and costs can be substantially reduced.

Also, since the washing water is activated by its passing between the water quality improving materials 6, 6a . . . , dust adhered on the surface W1 of the automobile can be isolated and the washing effect can be enhanced, thereby detergents become unnecessary and environmental disruption can be prevented.

Furthermore, the washing water passed between the water quality improving materials 6, 6a . . . is jetted toward the surface W of the automobile in a condition containing the boric silica S1, S2 . . . as partial components of the water quality improving materials 6, 6a . . . , and the boric silica S1, S2 . . . is firmly implanted due to electrodeposition action of the electric charges generated by tourmaline and adhered to the minute unevennesses on the surface W so as to form the coat M1, and then, since the boric silica coat M1 is a glass material, the waterproof effect thereof is excellent, dirt is barely adhered thereon, time and labor for waxing is saved, and once the coat M1 is formed, only water is necessary to wash the automobile, and thus detergents and chemicals can be made unnecessary.

The raw ceramic powder material containing tourmaline is adhered on the surfaces of the ceramic carriers 19, and then fired to form the tourmaline containing films 18, and thus, the tourmaline is unevenly distributed only onto the surface layer portions of the water quality improving materials 6, 6a, thereby bringing the tourmaline and the source water efficiently into contact, and the efficiency in activating the water can be improved, and elution of boric silica S1, S2 . . . can be enhanced, and furthermore, the content of tourmaline necessary for the water quality improving materials 6, 6a . . . can be reduced so that production costs can be reduced.

Also, before forming the films 18 by sintering, the ceramic powder is molded and fired to form the carriers 19, and thus firing of the carriers 19 becomes possible at a high temperature equal to or higher than the temperature at which tourmaline loses its electrical characteristics, thereby improving the hardness and strength of the carriers 19.

Also, since the films 18 comprise a mixture of tourmaline powder, borax, and sodium silicate powder, borax and sodium silicate powder as the melting agent lower the sintering temperature, whereby sintering and fixation of the films 18 to the carriers 19 at a temperature lower than the temperature at which tourmaline loses electrical characteristics can be performed easily.

Also, since the carriers 19 comprise a mixture of smashed zeolite, and Bakuhan-seki stones, the zeolite and Bakuhan-seki stones have an adsorption effect and the ceramic surfaces have unevenness, and thus, sintering and fixation of tourmaline containing films 18 to the surfaces of the carriers 19 can be performed securely.

Also, since the mineral constituents contained in the constitution of the Bakuhan-seki stones act as the melting agent, when the Bakuhan-seki stones are mixed with zeolite, sintering of the carriers 19 becomes easy and strength of the carriers 19 can be improved.

Since the water quality improving materials 6, 6a . . . are used with the water quality improving sub-materials 20, 20a . . . containing magnesia as the main component, by eluting minerals in the source water passing through the water activation tank 3 of the washing device 1, water quality of the activated washing water is made alkaline and washing power can be improved and by actions similar to those of the water quality a improving materials 6, 6a . . . wherein the tourmaline containing films 18 are formed, water is activated, thereby improving washing power.

Since the ceramic powder material containing tourmaline is adhered on the surfaces of the ceramic carriers 19, and then sintered to form the tourmaline containing films 18, and the ceramic powder is molded and fired to form the carriers 19, the production of novel substances such as the present invention mainly comprises simple processes and processes in the ceramic industry can be diverted into said production, and thus, the water quality improving materials, 6, 6a . . . can be produced at a low price.

Also, since the films 18 comprises a mixture of tourmaline, powder, boraxes, and sodium silicate powder and the carriers 19 comprise a mixture of smashed zeolite and Bakuhan-seki stones, significant effects thereof for practical use can be provided such that most of these raw materials can be stably obtained form natural ores in a great quantity and at a low price.

BRIEF DESCRIPTION OF THE DRAWINGS

The foregoing and other features and advantages of the present invention will become more readily more appreciated as the same becomes better understood by reference to the following detailed description when taken into conjunction with the accompanying drawings wherein.

DESCRIPTION OF THE PREFERRED EMBODIMENT

Figure 1:
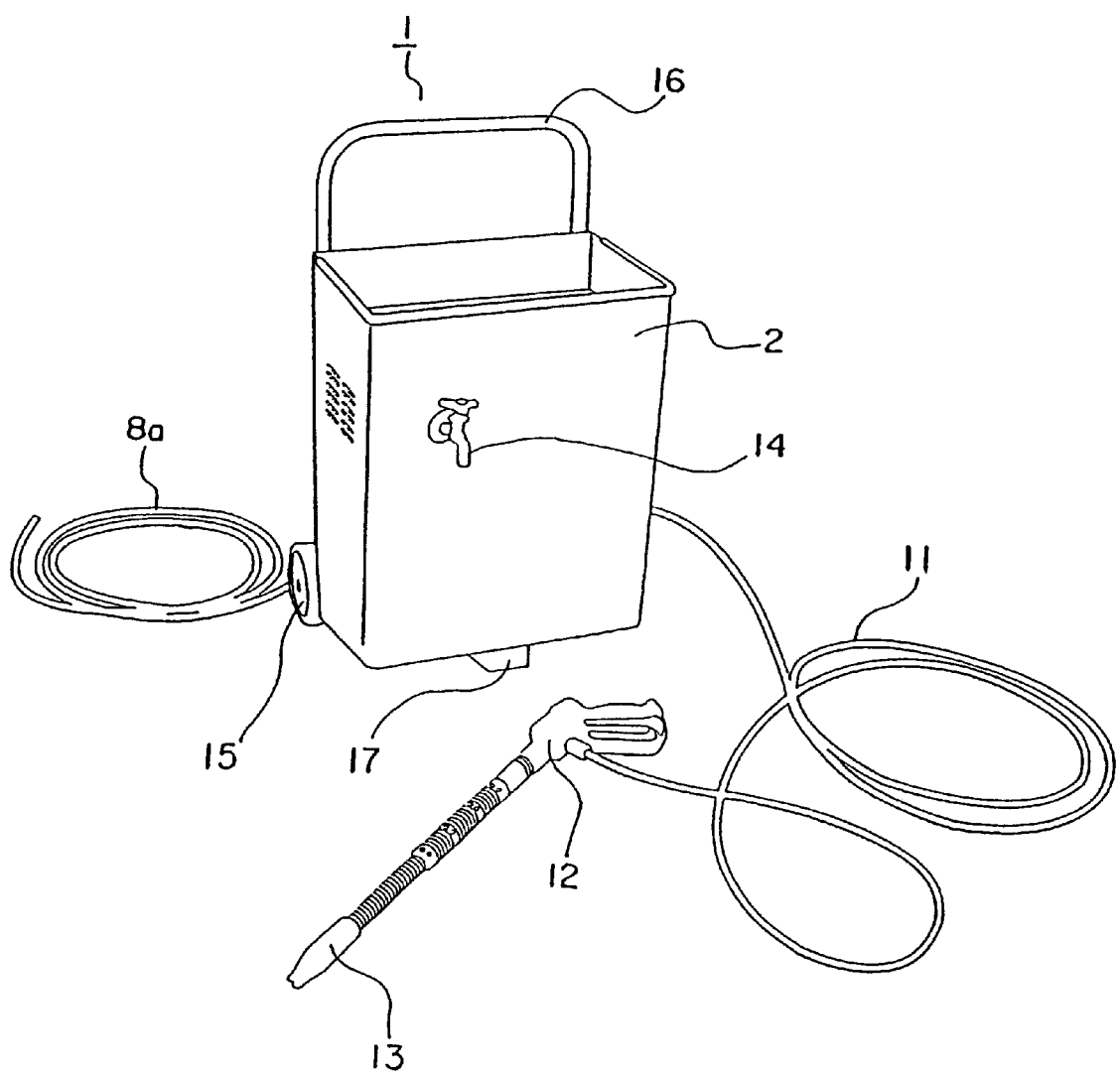
FIG. 1 is a perspective view of a washing device filled with the water quality improving materials according to the present invention.
Figure 2:
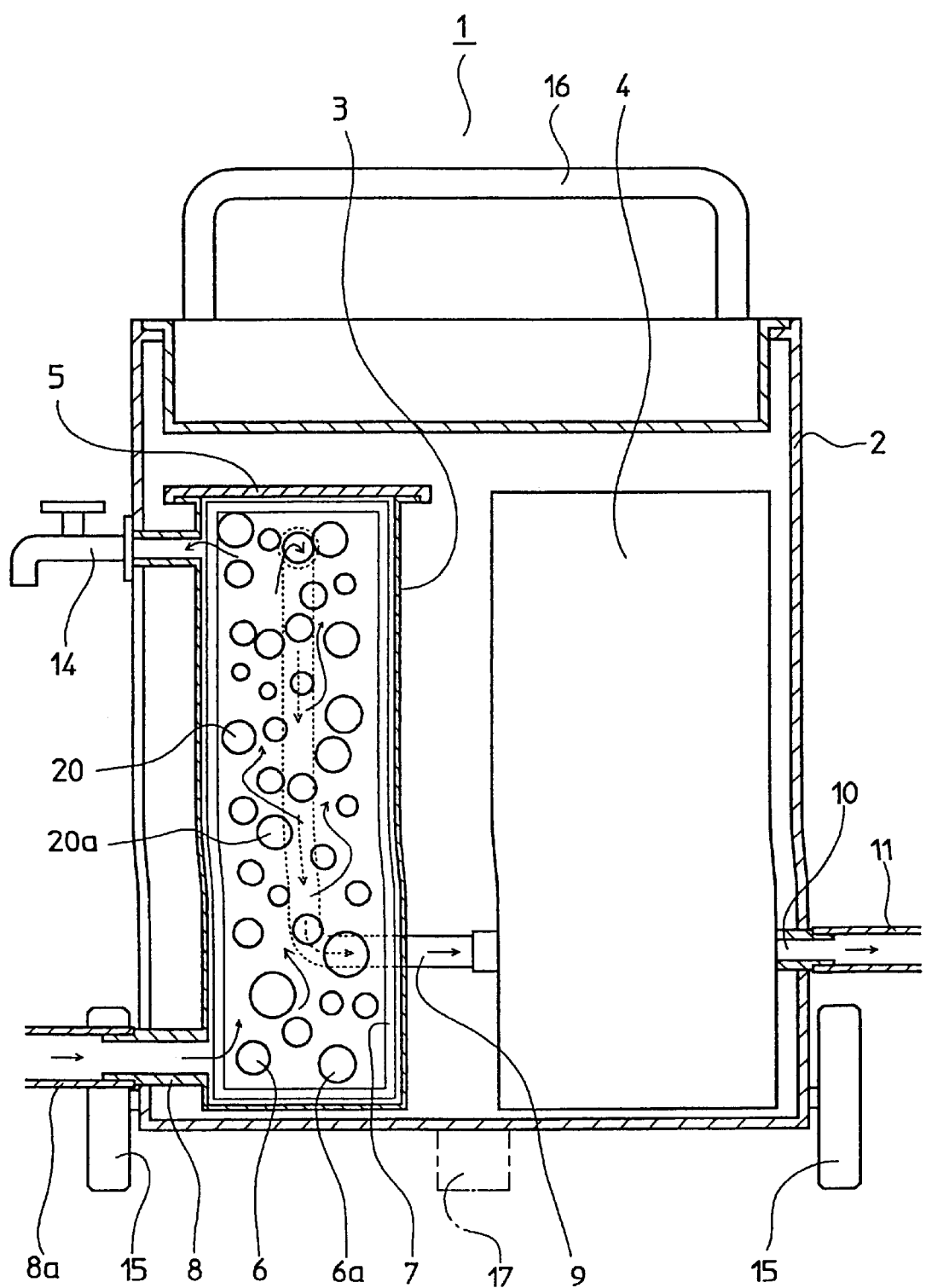
FIG. 2 is a longitudinal sectional view from the front side of the main body.
Figure 3:
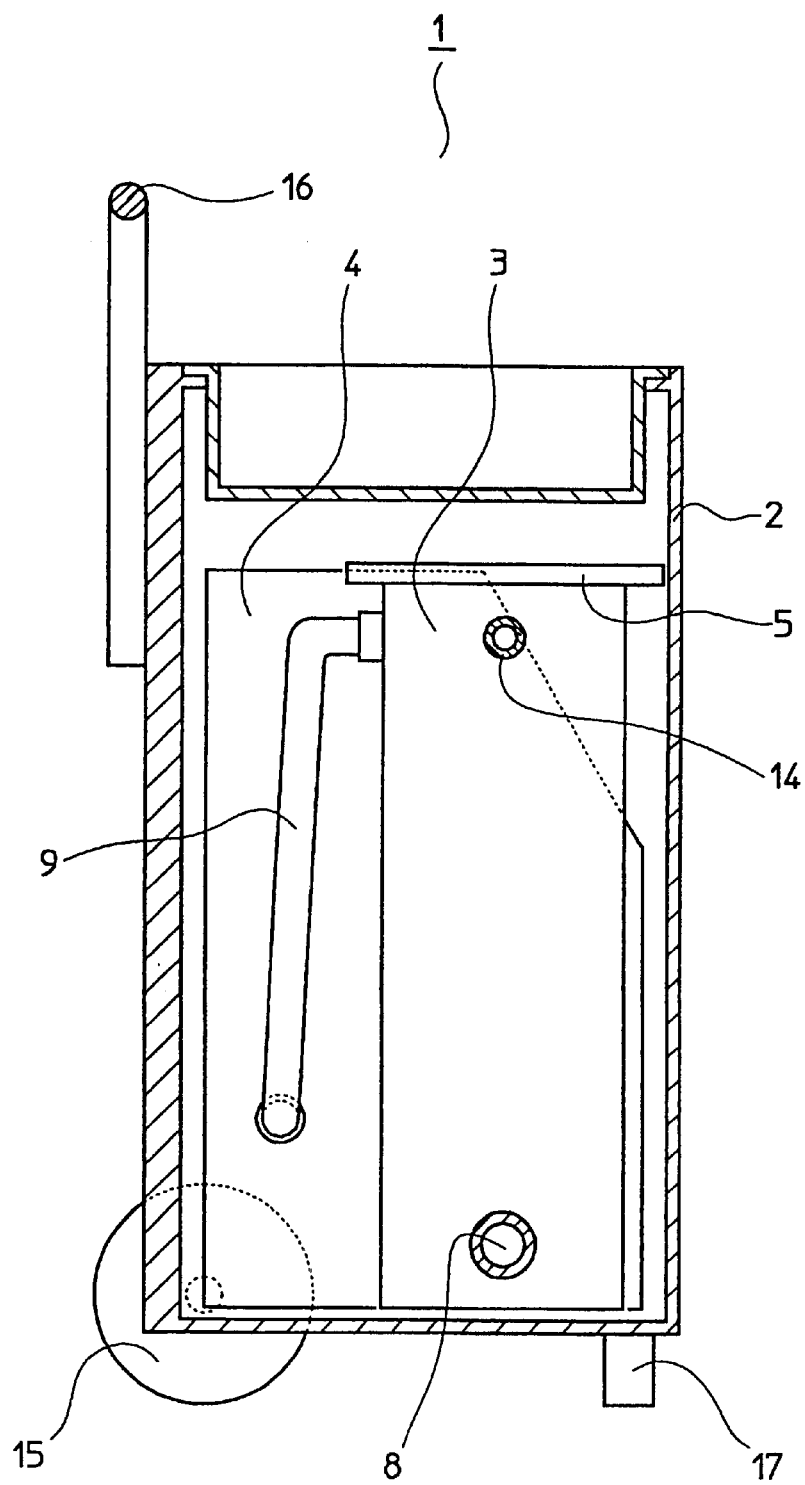
FIG. 3 is a longitudinal sectional view from the left side of the main body.
Figure 4:
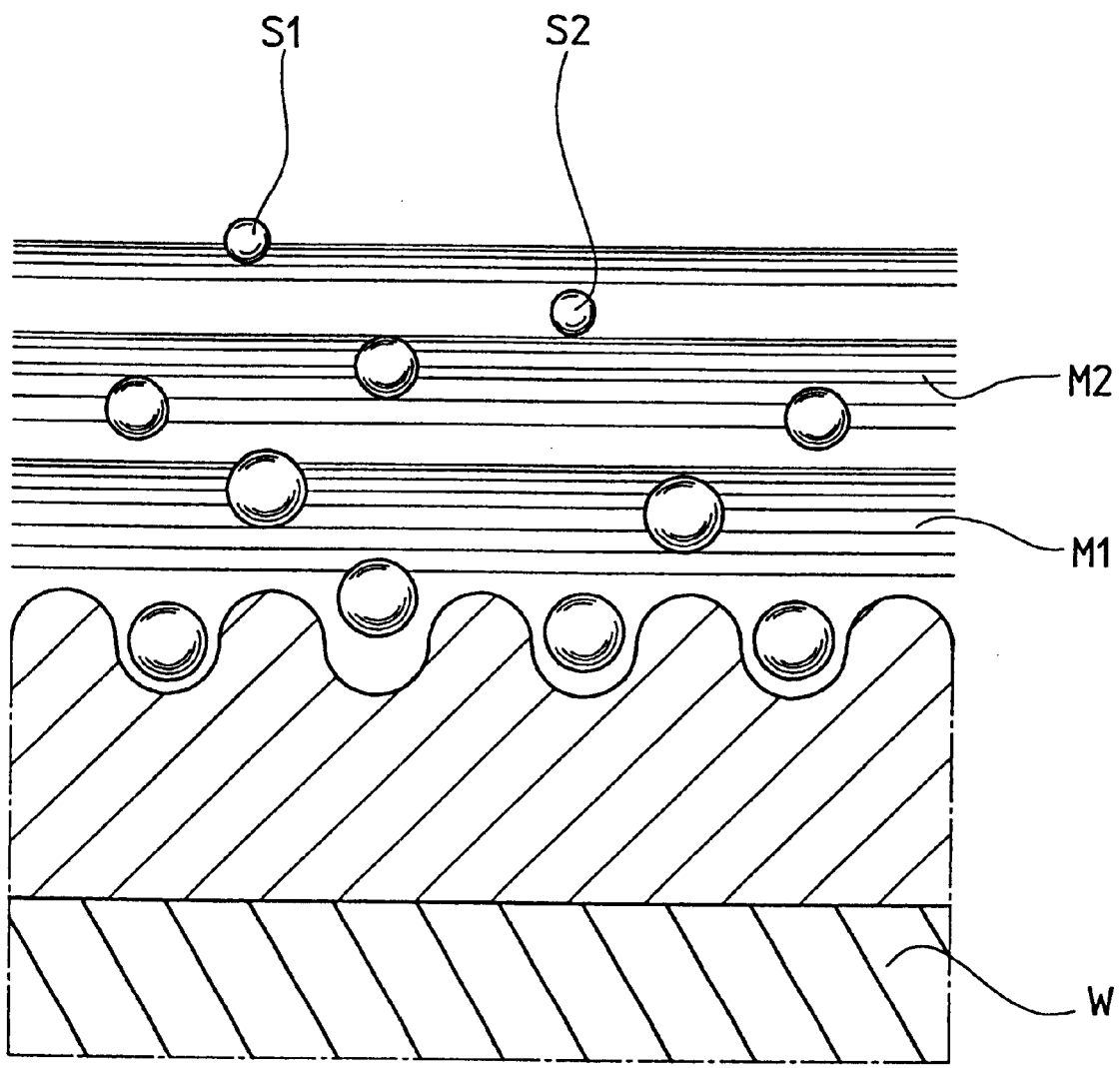
FIG. 4 is a explanatory view of a condition where a coat is formed on the surface of an automobile.
Figure 5:
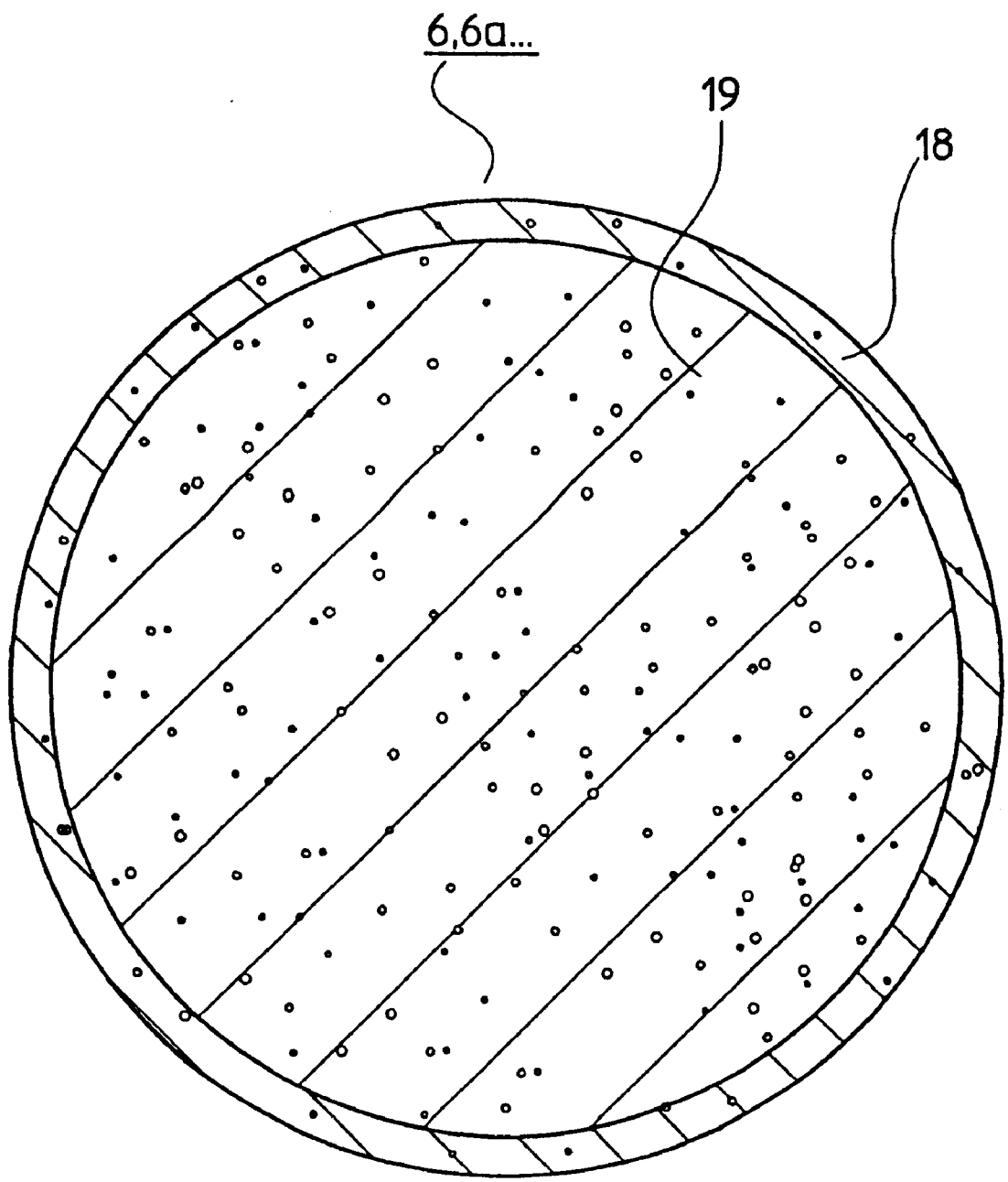
FIG. 5 is a schematic sectional view of a water quality improving material.

Hereinafter, an embodiment of the present invention will be described with reference to the drawings.

In a washing device 1 into which the water quality improving materials of the present invention are filled and used, a water activation tank 3 and a high pressure water sending device 4 are incorporated in a base case 2.

The water activation tank 3 comprises a lid body 5 which is freely attachable and detachable on the upper portion thereof and in the water activation tank 3, a cartridge 7 filled with a large number of globular (granular) water quality improving materials 6, 6a . . . having a size of a few mm is mounted so as to be freely replaceable.

Then, a water inlet 8, to which a water supply pipe 8a of tap water under a water supply pressure is directly connected, is provided on the lower portion of the water activation tank 3, and the upper portion of the water activation tank 3 and water sending device 4 are communicated by means of a coupling pipe 9.

Herein, in terms of the diameters of the water inlet 8 and coupling pipe 9 provided on the supply side and drain side of the activation tank 3, respectively, the diameter of the coupling pipe 9 on the downstream drain side is made smaller.

Also, a high pressure hose 11, a gun 8, and a nozzle 13 are connected to a high pressure water of emission port 10 of the water sending device 4 in series.

Furthermore, an outlet port 14 to expel the activated water is provided on the water activation tank 3, furthermore, wheels 15, a handle 16, a leg body 17, a switch, and a power source plug, etc. are attached to the base case 2, and a load placement portion is provided on the upper surface thereof.

Then, a washing method for automobiles using the water quality improving materials according to the preset invention will be described. The tap water supply pipe 8a is connected to the water inlet 8 of the water activation tank 3 mounted with the cartridge 7 in which a large number of granular water quality improving materials 6, 6a . . . are stored and through which water passes freely, while the high pressure hose 11, gun 12, and nozzle 13 are connected to the emission port 10 of the activated washing water of the water sending device 4 in series, and then, the water sending device 4 is actuated.

In accordance with the start of the washing device 1, when source water (tap water) sent from the water inlet 8 passes through the water activation tank 3, the boric silica S1, S2 . . . (cryogenic glass) eluted from tourmaline containing films 18 of the water quality improving materials 6, 6a . . . is contained in the source water and the boric silica S1, S2 . . . is charged with electricity by the action of tourmaline, besides, the source water is electrolyzed and improved in water quality to become activated water and which is sent from the water activation tank 3 to the water sending device 4 through the coupling pipe 9.

The boric silica-containing activated water that flows into the water sending device 4 is jetted from the nozzle 13 through the high pressure hose 11 and gun 12, etc. toward a surface W of the automobile (including glass surfaces and other surfaces) as high pressure water for washing, thereby dirt adhered to the surface W of the automobile is washed away by the activated washing water and the boric silica S1, S2, . . . contained in the washing water adheres to the surface W due to electric charges and enters minute unevennesses of the surface W, and then a thin glass coat M1 is formed on the surface W.

Then, the detailed actions in the abovementioned basic washing method W will be described.

First, a great number of granular water quality improving materials 6, 6a . . . and 20, 20a . . . stored in the water activation tank 3 into which source water flows have two types.

The water quality improving materials 6, 6a . . . of the first type contain components formed by mixing and sintering zeolite, Bakthan-seki stones, and tourmaline or components formed by sintering the tourmaline containing films 18 on the surface of carriers 19 which is formed by mixing and sintering zeolite and Bakuhan-seki stones, and such water quality improving materials 6, 6a . . . contain the boric silica S1, S2, that is, cryogenic glass, therefore, a small amount of boric silica is eluted in the source water circulating inside the water activation tank 3 and mixed in the source water.

Herein, tourmaline which is fixated on the surfaces of the water quality improving materials 6, 6a . . . and then form the films 18 is a kind of silicate mineral and it has a characteristic such that electric charges (piezoelectricity and potential, etc.) are generated on the surfaces by being put under pressure (changes in pressure) or being given a shock.

Also, in water, tourmaline allows the boric silica S1, S2 . . . contained in tourmaline to elute easily and generates electric charges by elution of the boric silica S1, S2 . . . as well.

Therefore, when tourmaline generates the electric charges the surfaces of the boric silica S1, S2 . . . mixed in the source water are electrified by the electric charges, and the boric silica S1, S2 . . . is brought into a so-called charged particle condition so that the electrodeposition action is provided.

Also, due to the electric charges generated by tourmaline, the water which passes around the water quality improving materials 6, 6a . . . electrolyzes, and as a result, the water is improved in quality and activated.

On the other hand, the water quality improving sub-materials 20, 20a . . . of the second type contain components formed by sintering magnesia. These water quality improving sub-materials 20, 20a ... have an action to alkalize water quality by allowing the contained minerals to elute.

Also, similar to the water quality improving materials 6, 6a containing tourmaline as the major component, the water quality improving sub-materials 20, 20a ... which are soft magnetic materials and dielectrics and which have the water activation action, and therefore, it is considered that the source water is activated by the following actions due to contact with the water which passes around the water quality improving sub-materials 20, 20a . . . .

For example, it is considered that the water quality improving sub-materials 20, 20a ... come into contact with water, thereby generating static electricity and the potential is changed, and then, due to a faint current thus generated, water is electrolyzed and due to lines of magnetic force thus generated, water is activated.

Examples of actions for improving water quality by means of the two types of water quality improving materials 6, 6a ... and 20, 20a ... as described above include so-called magnetic water, magnetized water, and structure-changed water. For example, it is considered that magnetic action acts on a water structure such as ionic bonds and hydrogen bonds and clusters (bonds of water molecules $H_2O$) become small, thereby the water structure becomes sparse and activates, and according to the sparse water structure, dirt adhered on the surface W of the automobile can be contained in the water structure, as a result, washing effects are enhanced.

According to water activation, in addition to the action of the water quality improving materials 6, 6a ... (including the water quality improving sub-materials 20, 20a ... hereinafter, the same is applied in terms of the washing action), a pressure acting on the source water changes after the water flows in the water activation tank 3 filled with the water quality improving materials 6, 6a ..., and the pressure increases (change in pressure) due to the difference in diameters between the water inlet 8 and coupling pipe 9 having a smaller diameter in front and behind of the water quality improving materials 6, 6a ..., as a result, water viscosity changes, a change in the water structure occurs, and a change in pressures occurs. In addition, since gaps between a great number of water quality improving materials 6, 6a ... accommodated in the water activation tank 3 become random, the current of the source water, which flows into the water activation tank 3 under a water supply pressure, is intensively disarranged so that turbulence is produced, therefore, the water pressure around the water quality improving materials 6, 6a ... locally increases and decreases and the interior of the water activation tank 3 is brought into a stirred condition due to intensive turbulence.

Due to these actions by running water, generation of electrical discharges in tourmaline and elution of the boric silica S1, S2 ... from the films 18 containing tourmaline are enhanced.

When the boric silica-contained activated washing water is jetted onto the surface of the automobile, dirt adhered on the surface W is removed by the pressured water jetted under a high pressure or is removed so as to contain dirt in the activated water.

Also, at the same time as the washing action, an electrodeposition action due to the electric charges generated by tourmaline is produced, whereby the electrified boric silica S1, S2 ... contained in the washing water is firmly implanted in the surface W of the automobile and since minute innumerable unevennesses exist on the surface W such as a painted surface or a glass face of the automobile, boric silica S1, S2 ... contained in the washing water enters and adheres to the unevennesses to form a thin coat M1.

Such boric silica coat M1 is also a glass material, the surface coat M1 has waterproof characteristics, and therefore, dirt barely adheres.

Finally, a preferred mode making use of the abovementioned washing methods is described.

When the washing method according to the present invention is performed for the first time, unless dirt on an automobile is sufficiently removed, dirt is firmly contained within a boric silica coat M1, therefore, it is crucial, only for the first time, to wash the automobile with detergent.

Also, when the washing according to the present invention is performed even once, thereafter, washing only with water is sufficient, however, by washing according to the present invention a plurality of times, new coats M2, M3 ... are formed one after another on the coat M1, the surface becomes glossy and its waterproof effect improves.

Furthermore, according to the abovedescribed washing device and washing method, by performing washing a plurality of times the coats M1, M2 ... are formed as a plurality of layers, thereby the coats M1, M2 become firm, and therefore, maintenance of the automobile thereafter becomes easy.

Also, by using detergent during washing for the first time, if the surface of the automobile is dirty, dirt is removed by washing with a detergent, and thereby dirt is prevented from remaining in the coats M1, M2 . . . .

Also, by constructing the cartridge 7 filled with the water quality improving materials 6, 6a ... so as to be freely attachable and detachable in the water activation tank 3, the water quality improving materials 6, 6a ... which have been used for a long period of time are replaced, thereby washing effects are reproduced and the water quality improving materials 6, 6a ... can be replaced easily.

Also, by forming the diameter of the coupling pipe 9 to be smaller than the diameter of the water inlet 8, three actions of generation of electric charges (electrification), containing boric silica, and activation are enhanced due to the changes in pressure, thereby effectiveness of the washing water is improved.

Also, by providing a outlet port 14 on the water activation tank 3, the boric silica-contained activated water can be taken out in a separate bucket, thereby improving convenience.

Now, an example method for producing the water quality improving materials 6, 6a ... according to the present invention will be described.

Basically, powders of ceramics (all raw materials in the ceramic industry including raw materials of ceramics such as kaolin and feldspar and raw materials of fine ceramics such as alumina and zirconium oxide) are molded into a roughly globular shape or granulated and then fired to form the carriers 19, then the raw ceramic powder material containing tourmaline is adhered on the surfaces of the carriers 19 and then fired to form tourmaline containing films 18.

Specifically, first, zeolite and Bakuhan-seki stones are smashed and mixed, and then the mixture is molded into a roughly globular shape or granulated, thereafter the globular or granular materials are fired at 1000–1100° C. so as to form the carriers 19, then raw ceramic powder material formed by mixing tourmaline powder, boraxes, and sodium silicate powder is put in a pan-type rolling granulating machine along with the carriers 19 and mixed while an appropriate amount of water is added, thereby the raw ceramic powder material containing tourmaline is adhered onto the surfaces of the carriers 19, which are then fired at 600–1000° C., thereby forming the tourmaline containing films 18.

Herein, the carriers 19 are, in terms of hardness and strength as described above, preferably formed by firing, however, the carriers 19 which make use of ceramic raw materials that have been roughly smashed into an appropriate granular size and which have not been fired may be used.

Also, if tourmaline is heated at a temperature over 1000° C., tourmaline changes its crystal form (transformation) and loses its electrical characteristics, therefore, when the tourmaline containing films are formed, they must be fired at a temperature of 1000° or below.

Also, in order to sinter the raw ceramic powder material containing tourmaline firmly and fixate it on the carriers 19, and then form the films 18, it was confirmed that firing must be performed at 600° C. or more.

Also, it was confirmed that in a case where the films 18 are formed by mixing tourmaline powder, boraxes, and sodium silicate powder, when 30% or less by weight of tourmaline powder is contained, tourmaline to be fixated to the surfaces of the carriers 19 is lacking and efficiency to improve water quality becomes low, when 70% or more by weight of tourmaline powder is contained, boraxes and sodium silicate which act as a melting agent are lacking and to sinter and adhere tourmaline to the surfaces of the carriers 19 at 1000° C. or less becomes difficult, and when 30–70% of tourmaline powder is contained, 50–20% of boraxes is contained, and 25–10% of sodium silicate is contained by weight, the tourmaline containing films 18 can be firmly fixated and formed and sufficient water quality improving effects can be provided for practical use.

Also, in a case where the carriers 19 are formed by smashing and mixing 50% of zeolite and 50% of Bakuhan-seki stones, after they were sintered at 1000–1100° C., a satisfactory sintering result was confirmed, however, the raw materials of the carriers 19 and the firing temperature thereof are not limited to the above, and other ceramic raw materials may be appropriately mixed and used. In a case where other ceramic raw materials are used, it is desirable to take characteristics of the selected ceramic raw materials into consideration and to perform settings so that the selected ceramic raw materials can be sintered sufficiently firmly.

The size of the carriers 19 can appropriately be adjusted depending on the scale of the washing device 1 to be used while the grain size of the carriers 19 needs to be taken into consideration in terms of the thickness of the tourmaline containing films 18 which are to be formed on the surfaces of the carriers 19. It is satisfactory, for example, when the grain size of the carriers 19 is 5 mm, the films 18 having a thickness of 0.2 mm are formed while when the grain size of the carriers 19 is 30 mm, the films 18 having a thickness of 2 mm are formed.

Herein, according to the method for producing the water quality improving materials 6, 6*a* . . . , the tourmaline containing films 18 are formed after the carriers 19 are sintered and formed, and therefore, the temperature is not limited to be lower than the temperature at which tourmaline transforms its crystal form and loses its electrical characteristics and the carriers 19 can be sintered and formed at a higher temperature.

Also, since the tourmaline powder, boraxes, and sodium silicate powder are mixed, the boraxes and sodium silicate powder as the melting agent allow a lower sintering temperature of the films 18.

Also, the carriers 19 comprise a mixture of the smashed zeolite and Bakuhan-seki stones having an adsorption action, thereby carriers 19 having excellent adsorption characteristics can be provided.

Also, since the Bakuhan-seki stones contain many mineral constituents (such as metal oxides) in the constitution thereof, when they are mixed with zeolite, the mineral constituents work as the melting agent, thereby the sintering temperature of the carriers 19 can be lowered.

What is claimed is:

1. A water quality improving material comprising a sintered ceramic carrier having a tourmaline-containing film provided thereon, said film containing 30–70 wt. % tourmaline, boraxes in an amount of from 50–20 wt. % and sodium silicate in an amount of from 25–10 wt. %.

2. The water quality improving material of claim 1, wherein said film has a thickness of from 0.2–20 mm.

3. The water quality improving material of claim 1, wherein said sintered ceramic carrier is formed from 50 wt. % zeolite and 50 wt. % Bakuhan-seki stones.

4. A water quality improving material comprising a sintered ceramic carrier formed from 50 wt. % zeolite and 50 wt. % Bakuhan-seki stones and having a tourmaline-containing film provided thereon.

5. The water quality improving material of claim 4, wherein said film contains 30–70 wt. % tourmaline.

6. The water quality improving material of claim 4, wherein said film has a thickness of from 0.2–2.0 mm.

* * * * *